(12) United States Patent
Panguluri

(10) Patent No.: US 11,146,621 B2
(45) Date of Patent: *Oct. 12, 2021

(54) RETRIEVAL AND PLAYOUT OF MEDIA CONTENT

(71) Applicant: Gracenote Digital Ventures, LLC, New York, NY (US)

(72) Inventor: Venkatarama Anilkumar Panguluri, Milpitas, CA (US)

(73) Assignee: Gracenote Digital Ventures, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,025

(22) Filed: Jul. 20, 2020

(65) Prior Publication Data

US 2020/0351331 A1   Nov. 5, 2020

Related U.S. Application Data

(63) Continuation of application No. 16/433,778, filed on Jun. 6, 2019, now Pat. No. 10,764,358, which is a
(Continued)

(51) Int. Cl.
*H04L 29/08* (2006.01)
*H04L 29/06* (2006.01)
(Continued)

(52) U.S. Cl.
CPC ............ *H04L 67/10* (2013.01); *G06F 16/435* (2019.01); *G06F 16/4387* (2019.01);
(Continued)

(58) Field of Classification Search
None
See application file for complete search history.

(56) References Cited

U.S. PATENT DOCUMENTS 6,513,043 B1   1/2003  Chan et al.
6,587,127 B1 *  7/2003  Leeke ..................... G06F 3/165
                                                    715/765
(Continued)

FOREIGN PATENT DOCUMENTS

KR    1020100000249 A    1/2010
KR    1020110117496 A    10/2011
(Continued)

OTHER PUBLICATIONS

Non-Final Office Action dated May 2, 2019 for U.S. Appl. No. 14/280,337.
(Continued)

*Primary Examiner* — Backhean Tiv
(74) *Attorney, Agent, or Firm* — McDonnell Boehnen Hulbert & Berghoff LLP

(57) ABSTRACT

An example method involves accessing a playlist defining a sequence of media content items including a first media content item and a second media content item; retrieving, from one or more server devices, first data representing the media content items of the received playlist, and using the retrieved first data to playout the media content items in accordance with the sequence defined by the playlist; determining a status of an event, and using the determined status of the event as a basis to determine a condition; making a determination that the determined condition has been satisfied; and responsive to making the determination that the determined condition has been satisfied, (i) retrieving second data representing a media content item related to the event, and (ii) using the retrieved second data to playout the media content item related to the event in between playing out the first and second media content items.

20 Claims, 6 Drawing Sheets

Related U.S. Application Data continuation of application No. 14/341,503, filed on Jul. 25, 2014, now Pat. No. 10,362,094.

(51) Int. Cl.
*H04N 21/262* (2011.01)
*H04N 21/442* (2011.01)
*H04N 21/466* (2011.01)
*G06F 16/435* (2019.01)
*G06F 16/438* (2019.01)
*G06F 16/48* (2019.01)

(52) U.S. Cl.
CPC .......... *G06F 16/48* (2019.01); *H04L 65/4076* (2013.01); *H04L 65/4084* (2013.01); *H04L 67/306* (2013.01); *H04N 21/26258* (2013.01); *H04N 21/44204* (2013.01); *H04N 21/4668* (2013.01)

(56) References Cited

U.S. PATENT DOCUMENTS

| | | | |
|---|---|---|---|
| 7,689,705 B1* | 3/2010 | Lester | H04L 65/4076 709/231 |
| 8,359,382 B1* | 1/2013 | Gailloux | H04L 65/60 709/223 |
| 8,875,184 B1* | 10/2014 | Bakare | H04N 21/25891 725/41 |
| 9,319,461 B2* | 4/2016 | Perkuhn | H04L 67/02 |
| 9,798,509 B2* | 10/2017 | Panguluri | G06F 3/16 |
| 10,362,094 B2* | 7/2019 | Panguluri | H04L 65/4084 |
| 10,599,705 B2* | 3/2020 | Panguluri | G06F 16/4387 |
| 10,599,706 B2* | 3/2020 | Panguluri | G06F 16/4387 |
| 10,757,159 B2* | 8/2020 | Panguluri | H04L 65/604 |
| 10,764,358 B2* | 9/2020 | Panguluri | H04N 21/4668 |
| 2001/0053944 A1* | 12/2001 | Marks | G06F 16/40 700/94 |
| 2002/0049974 A1* | 4/2002 | Shnier | G06F 16/40 725/47 |
| 2002/0053078 A1* | 5/2002 | Holtz | G11B 27/34 725/14 |
| 2002/0188748 A1 | 12/2002 | Blackwell et al. | |
| 2003/0023638 A1 | 1/2003 | Weight | |
| 2003/0028505 A1* | 2/2003 | O'Rourke | H04L 65/4084 |
| 2003/0093794 A1* | 5/2003 | Thomas | G06F 16/9535 725/46 |
| 2003/0130894 A1 | 7/2003 | Huettner et al. | |
| 2003/0182315 A1* | 9/2003 | Plastina | H04N 21/4826 |
| 2004/0163115 A1* | 8/2004 | Butzer | H04N 21/23424 725/88 |
| 2004/0199387 A1* | 10/2004 | Wang | G10L 17/26 704/243 |
| 2005/0267973 A1* | 12/2005 | Carlson | H04L 67/26 709/228 |
| 2006/0047701 A1 | 3/2006 | Maybury et al. | |
| 2007/0256021 A1* | 11/2007 | Prager | H04L 67/02 715/744 |
| 2007/0279247 A1* | 12/2007 | Rye | G08C 17/02 340/13.25 |
| 2007/0282898 A1* | 12/2007 | Stark | H04N 21/26258 |
| 2008/0016081 A1* | 1/2008 | MacMillan | G06F 16/437 |
| 2008/0033990 A1 | 2/2008 | Hutson | H04N 21/4825 |
| 2008/0040212 A1* | 2/2008 | Grouf | G06Q 30/0269 705/14.48 |
| 2008/0293393 A1 | 11/2008 | Hartmaier | |
| 2009/0124193 A1* | 5/2009 | Mitzel | H04H 60/73 455/3.01 |
| 2009/0157731 A1* | 6/2009 | Zigler | G06F 16/686 |
| 2009/0302108 A1 | 12/2009 | Patrick et al. | |
| 2009/0313303 A1* | 12/2009 | Spence | G06F 16/4387 |
| 2009/0313432 A1* | 12/2009 | Spence | G11B 27/105 711/115 |
| 2010/0010648 A1* | 1/2010 | Bull | G06F 3/04842 700/94 |
| 2010/0057928 A1* | 3/2010 | Kapoor | G06F 16/4387 709/231 |
| 2010/0064053 A1 | 3/2010 | Bull et al. | |
| 2010/0095333 A1* | 4/2010 | Kelly | H04N 21/654 725/100 |
| 2010/0162330 A1* | 6/2010 | Herlein | H04N 21/812 725/93 |
| 2010/0175079 A1 | 7/2010 | Braun et al. | |
| 2010/0241963 A1 | 9/2010 | Kulis et al. | |
| 2010/0275221 A1* | 10/2010 | DuVall | H04L 65/605 719/328 |
| 2011/0035705 A1 | 2/2011 | Faenger et al. | |
| 2011/0040718 A1* | 2/2011 | Tendjoukian | H04L 67/2847 706/52 |
| 2011/0069936 A1* | 3/2011 | Johnson | H04N 21/41422 386/248 |
| 2011/0131180 A1 | 6/2011 | Tuli et al. | |
| 2011/0145370 A1* | 6/2011 | Nieuwenhuys | H04N 21/2668 709/219 |
| 2011/0167390 A1 | 7/2011 | Reed, Jr. et al. | |
| 2011/0239253 A1* | 9/2011 | West | H04N 21/2668 725/46 |
| 2011/0252118 A1* | 10/2011 | Pantos | G06F 3/0484 709/219 |
| 2011/0295669 A1* | 12/2011 | Stiebel | G06Q 30/02 705/14.19 |
| 2012/0066186 A1* | 3/2012 | Wohlert | G06F 16/435 707/691 |
| 2012/0124618 A1 | 5/2012 | Ruiz-Velasco et al. | |
| 2012/0245982 A1* | 9/2012 | Daniel | G06F 16/438 705/14.4 |
| 2012/0254755 A1* | 10/2012 | Wohlert | G06F 16/4387 715/716 |
| 2012/0259727 A1 | 10/2012 | Fermin et al. | |
| 2012/0290932 A1* | 11/2012 | Johnson | G11B 27/105 715/716 |
| 2012/0331106 A1 | 12/2012 | Ramamurthy et al. | |
| 2013/0081083 A1 | 3/2013 | Yu et al. | |
| 2013/0178962 A1 | 7/2013 | DiMaria et al. | |
| 2013/0179275 A1 | 7/2013 | Harb | |
| 2013/0304822 A1* | 11/2013 | Tetreault | H04N 21/2187 709/204 |
| 2013/0332532 A1* | 12/2013 | Bernhardsson | G06F 16/48 709/204 |
| 2014/0068662 A1* | 3/2014 | Kumar | H04N 21/812 725/34 |
| 2014/0074813 A1* | 3/2014 | Franks | G06F 16/40 707/706 |
| 2014/0082659 A1 | 3/2014 | Fife et al. | |
| 2014/0136554 A1* | 5/2014 | Moradi | G06F 16/435 707/754 |
| 2014/0208206 A1 | 7/2014 | Scott et al. | |
| 2014/0258292 A1* | 9/2014 | Thramann | G06F 16/48 707/736 |
| 2015/0074191 A1* | 3/2015 | Feng | H04L 63/102 709/204 |
| 2015/0074526 A1 | 3/2015 | Brenner et al. | |
| 2015/0106841 A1* | 4/2015 | Wolf | H04N 21/8455 725/32 |
| 2015/0296258 A1* | 10/2015 | Morten | H04N 21/4408 725/31 |
| 2016/0065637 A1* | 3/2016 | O'Malley | H04L 67/22 709/231 |
| 2018/0197158 A1* | 7/2018 | Smalley | G06Q 30/0623 |

FOREIGN PATENT DOCUMENTS

| | | |
|---|---|---|
| KR | 1020140014664 A | 2/2014 |
| WO | 2013013176 A1 | 1/2013 |

OTHER PUBLICATIONS

Non-Final Office Action dated May 8, 2019 for U.S. Appl. No. 14/280,350.
Final Office Action dated Jun. 5, 2018 for U.S. Appl. No. 14/280,337.
Final Office Action dated Jun. 12, 2018 for U.S. Appl. No. 14/280,350.

(56) References Cited

OTHER PUBLICATIONS

Advisory Action dated Sep. 25, 2018 for U.S. Appl. No. 14/280,350.
Advisory Action dated Sep. 25, 2018 for U.S. Appl. No. 14/280,337.
Australian Government, IP Australia, Notice of Acceptance for Patent Application dated Jan. 10, 2018, issued in connection with Australian Application No. 2014401801, 3 pages.
Final Office Action dated Apr. 12, 2017 of U.S. Appl. No. 14/280,337, filed May 16, 2014.
Extended European Search Report, European Patent Application No. 14898132.7, dated Mar. 2, 2018, 9 pages.
Non-Final Office Action dated Nov. 1, 2017 for U.S. Appl. No. 14/280,337.
Search and Examination Report of Australian Patent Application No. 2014401801, dated Oct. 18, 2017.
Non-Final Office Action dated Nov. 15, 2017 for U.S. Appl. No. 14/280,350.
U.S. Appl. No. 14/280,350, Advisory Action dated May 16, 2017.
Non-Final Office Action dated Jul. 21, 2016 of U.S. Appl. No. 14/280,350, filed May 16, 2014.
Non-Final Office Action dated Aug. 24, 2016 of U.S. Appl. No. 14/280,337, filed May 16, 2014.
International Search Report and Written Opinion dated Apr. 7, 2015, issued in connection with International Patent Application No. PCT/US2014/072817, filed on Dec. 30, 2014.
International Search Report and Written Opinion dated Mar. 24, 2015, issued in connection with International Patent Application No. PCT/US2014/072830, filed on Dec. 30, 2014.
International Search Report and Written Opinion dated Mar. 17, 2015, issued in connection with International Patent Application No. PCT/US2014/072825, filed on Dec. 30, 2014.
U.S. Appl. No. 14/280,337, filed May 16, 2014.
U.S. Appl. No. 14/280,350, filed May 16, 2014.
Printout of webpage relating to "Stitcher Radio for Podcasts" app, printed Mar. 4, 2014, 4 pages.
Printout of webpage relating to "Rivet News Radio" app, printed Mar. 4, 2014, 2 pages.
Printout of webpage relating to "Swell Radio for News and Podcasts" app, printed Mar. 4, 2014, 3 pages.
Printout of webpage relating to "Swell FAQs", printed Mar. 4, 2014, 6 pages.
Printout of webpage relating to Melissa Harris, "Pandora-like news radio app about to launch," dated Dec. 1, 2013, printed Jul. 7, 2014, 4 pages.
Notice of Allowance dated May 12, 2021, issued in connection with U.S. Appl. No. 16/787,879, filed Feb. 11, 2020, 16 pages.

* cited by examiner

RETRIEVAL AND PLAYOUT OF MEDIA CONTENT

CROSS REFERENCE TO RELATED APPLICATIONS

This U.S. patent application is a continuation of, and claims priority to, U.S. patent application Ser. No. 16/433,778, filed on Jun. 6, 2019, which is a continuation of, and claims priority to, U.S. patent application Ser. No. 14/341,503, filed on Jul. 25, 2014. The disclosures of these prior application is considered part of the disclosure of this application and are hereby incorporated by reference in their entirety.

USAGE AND TERMINOLOGY

In this disclosure, unless otherwise specified and/or unless the particular context clearly dictates otherwise, each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

To listen to the radio, a listener typically tunes a receiver to a particular frequency (e.g., an AM or FM frequency) and listens to music, news, or other audible content being broadcast on that frequency by a radio station. The listener may tune the receiver, and therefore select a radio station, in a variety of ways, such as by rotating a dial, pushing a seek button, or pushing a station preset button. By selecting one of multiple radio stations, the listener may exert some control over the audible content presented to the listener. However, although the listener may control which station is selected, the listener is unlikely to have any influence over the audible content that gets broadcast by the selected station.

Typically, a radio station broadcasts the same audible content to multiple receivers, and therefore to multiple listeners, at the same time. Given this, it is common for a radio station to produce and broadcast audible content that is intended to appeal to a variety of different listeners. However, while some listeners may find such audible content appealing, other listeners may find it unappealing because it is not tailored to their particular interests.

SUMMARY

In one aspect, a method is disclosed. The method involves (i) accessing a playlist defining a sequence of media content items including a first media content item and a second media content item; (ii) retrieving, from one or more server devices, first data representing the media content items of the received playlist, and using the retrieved first data to playout the media content items in accordance with the sequence defined by the playlist; (iii) determining a status of an event, and using the determined status of the event as a basis to determine a condition; (iv) making a determination that the determined condition has been satisfied; and (v) responsive to making the determination that the determined condition has been satisfied, (a) retrieving second data representing a media content item related to the event, and (b) using the retrieved second data to playout the media content item related to the event in between playing out the first and second media content items.

In another aspect, a non-transitory computer-readable medium is disclosed. The medium has stored thereon program instructions that when executed by a processor cause performance of a set of acts. The set of acts includes (i) accessing a playlist defining a sequence of media content items including a first media content item and a second media content item; (ii) retrieving, from one or more server devices, first data representing the media content items of the received playlist, and using the retrieved first data to playout the media content items in accordance with the sequence defined by the playlist; (iii) determining a status of an event, and using the determined status of the event as a basis to determine a condition; (iv) making a determination that the determined condition has been satisfied; and (v) responsive to making the determination that the determined condition has been satisfied, (a) retrieving second data representing a media content item related to the event, and (b) using the retrieved second data to playout the media content item related to the event in between playing out the first and second media content items.

In another aspect, a method is disclosed. The method involves (i) accessing a playlist defining a sequence of media content items including a first media content item and a second media content item; (ii) determining a status of an event, and using the determined status of the event as a basis to determine a condition; (iii) making a determination that the determined condition has been satisfied; and (iv) responsive to making the determination that the determined condition has been satisfied, (a) retrieving second data representing a media content item related to the event, and (b) transmitting to the client device, the retrieved second data for playout of the media content item related to the event in between playing out the first and second media content items.

In another aspect, a non-transitory computer-readable medium is disclosed. The medium has stored thereon program instructions that when executed by a processor cause performance of a set of acts. The set of acts includes (i) accessing a playlist defining a sequence of media content items including a first media content item and a second media content item; (ii) determining a status of an event, and using the determined status of the event as a basis to determine a condition; (iii) making a determination that the determined condition has been satisfied; and (iv) responsive to making the determination that the determined condition has been satisfied, (a) retrieving second data representing a media content item related to the event, and (b) transmitting to the client device, the retrieved second data for playout of the media content item related to the event in between playing out the first and second media content items.

These, as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
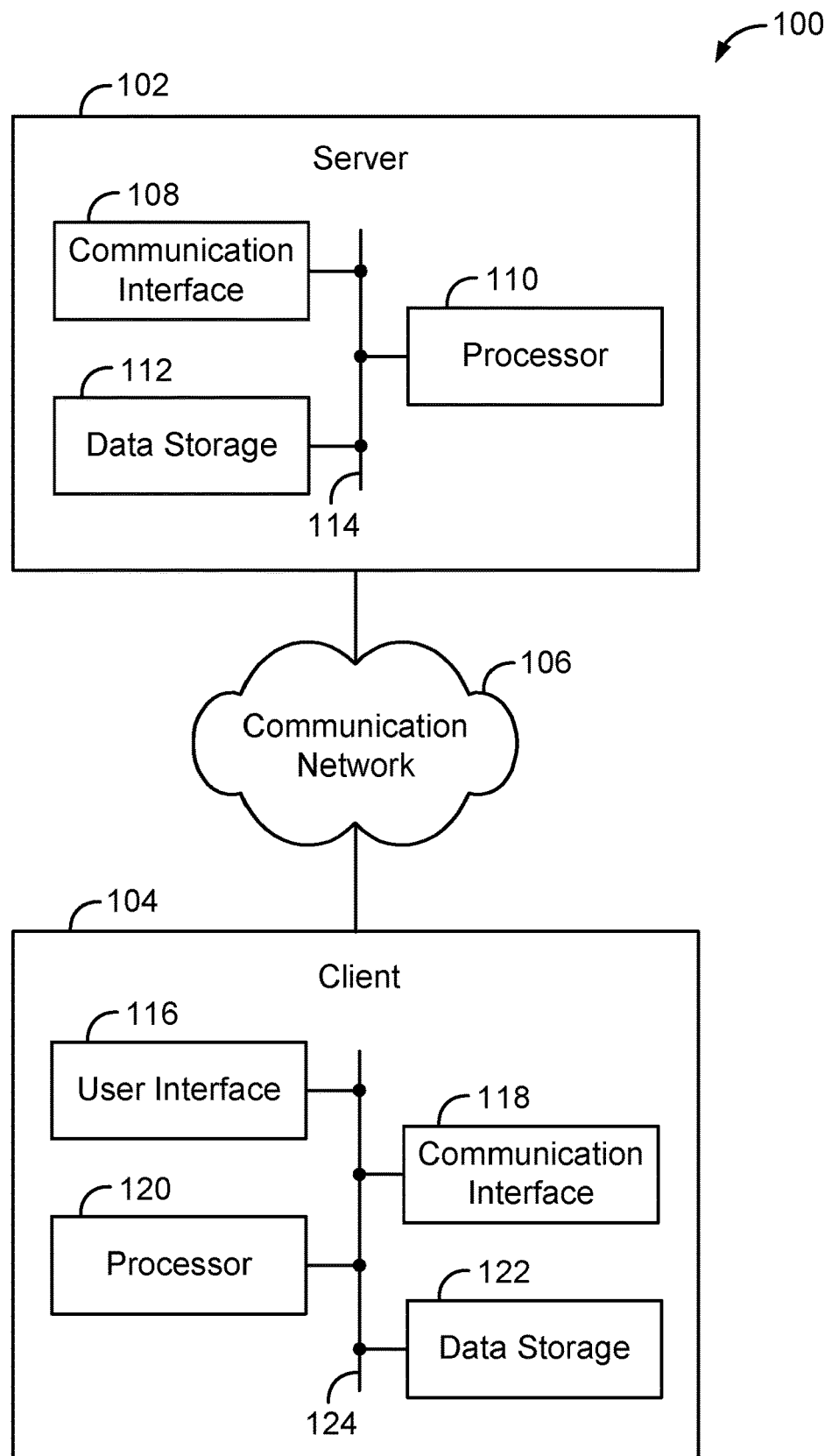
FIG. 1 is a simplified block diagram of an example system.

As indicated above, a radio station may produce and broadcast audible content that is intended to appeal to a variety of different listeners. For example, in the context of producing and broadcasting a news program, a narrator (such as a news anchor affiliated with the radio station, or another person) may read aloud news stories from each of a variety of different predetermined categories, such as sports, politics, and entertainment, and the readings may be included as part of the news program.

Although some listeners may be interested in audible versions of news stories from all of the predetermined categories, other listeners may have different interests. For example, one listener may be interested in sports and entertainment, but not politics, while another listener may be interested in politics and entertainment, but not sports. In either case, the listener may be presented with audible content that does not align with the listener's interests. As a result, the listener may find the news program unappealing.

One way to help address this issue is by implementing a system that provides a user with a personalized news program. In one aspect, such a system may include at least two computing devices, such as a server and a client, and a communication network through which the server and the client may communicate.

In this system, the server and the client may perform a variety of acts. For example, the server may determine a set of attributes associated with a user of the client and may use the determined set of attributes as a basis to generate a playlist of a personalized news program for the user. The generated playlist may define a sequence of media content items, each of which may include audio content, such as an audible version of a news story, and/or video content. An audible version of a news story may be referred to herein as an "audible news story." The generated playlist may also define media content attribute data respectively for each media content item, including for instance a reference to data representing the media content item and metadata characterizing the media content item. Collectively, this sequence of media content items may thus makeup a personalized news program.

After or as the server generates the playlist, the server may transmit the playlist to the client, and the client may traverse the entries of the playlist, retrieve data representing each referenced media content item, and use the data to playout each referenced media content item in accordance with the sequence defined by the playlist. In practice, for instance, for each media content item of the sequence, (i) the client may transmit to the server, or to another server for that matter, a request for data representing the media content item, (ii) the server may receive the transmitted request, (iii) responsive to the server receiving the transmitted request, the server may transmit to the client, the requested data, (iv) the client may receive the transmitted data, and (v) the client may playout for the user the media content item represented by the received data.

Optimally, this process may involve streaming of the data representing the media content items to the client and playout of the sequence of media content items in real time by the client. In particular, for each media content item referenced by the playlist, the client may request a server to stream the data representing the media content item to the client, and the client may then receive in response a data stream representing the requested media content item. As the client receives and buffers the requested data representing the media content items in sequence, the client may playout the represented media content items for a user, thus providing the user with a substantially continuous playout of the media content items that makeup the personalized news program.

In accordance with the present disclosure, another way to help render a news program, or for that matter any sequence of media content items, more appealing to a user is for the client to retrieve data representing a particular media content item that is not referenced in the playlist, and for the client to use the retrieved data to playout the particular media content item by inserting it into the news program at a particular position in the news program.

In one example, the particular media content item may relate to an event. The client may determine a status of the event, and use the determined status of the event as a basis to determine a condition. Then, the client may determine that the determined condition has been satisfied, and in response, the client may (i) retrieve data representing the particular media content item, and (ii) use the retrieved data to playout the particular media content item in between playing out two media content items referenced by the playlist.

To illustrate the effect of this feature, consider the following two examples that relate to a particular type of event, namely a baseball game. For these examples, it is assumed that at a first time, the game is in progress, and at a second time, the game is concluded (i.e., the game is not in progress).

In a first example, the client may access a first playlist defining a sequence of media content items including a first media content item and a second media content item. Note that throughout this disclosure, any use of a numerical modifier (e.g., "first" or "second") does not imply a sequential order unless explicitly indicated. At the first time, perhaps while the first media content item is being played out, the client may determine that the game is in progress. The client may the use this determined status of the game as basis to determine a first condition, which may be a condition that at least five minutes have passed since another media content item related to the game has been played out in connection with a separation between media content items of the playlist. The client may then determine that the condition has been satisfied, and in response, the client may (i) retrieve data representing a particular media content item providing a score of the game, and (ii) use the retrieved data to playout the particular media content item in between playing out the first and second media content items.

For comparison, in a second example, the client may access a second playlist defining a sequence of media content items including a third media content item and a fourth media content item. At the second time, perhaps while the third media content item is being played out, the client may determine that the game is not in progress. The client may the use this determined status of the game as basis to determine a second condition, which may be a condition that at least thirty minutes have passed since another media content item related to the game has been played out in connection with a separation between media content items of the playlist. The client may then determine that the condition has been satisfied, and in response, the client may (i) retrieve data representing a particular media content item providing a score of the game, and (ii) use the retrieved data to playout the particular media content item in between playing out the third and fourth media content items.

As illustrated by the two examples above, the client may use the status of the baseball game as a basis to determine when it will insert into a sequence of media content items, a media content item providing a score of the game. Indeed, according to these examples, if the game is in progress, the client may insert the media content item providing the score more frequently than if the game is not in progress. This may be appealing to a user who may prefer to receive score information more frequently while the game is in progress.

II. Example System

FIG. 1 is a simplified block diagram of an example system 100 in which aspects of the present disclosure can be implemented. As shown, the system 100 includes at least two computing devices, namely a server 102 and a client 104, and a communication network 106. Generally, the server 102 and the client 104 are configured for communicating with each other via the communication network 106.

A. Server

The server 102 may be configured for performing a variety of functions or acts, such as those described in this disclosure (including the accompanying drawings). The server 102 may take a variety of forms and may include various components, including for example, a communication interface 108, a processor 110, and a data storage 112, all of which may be communicatively linked to each other via a system bus, network, or other connection mechanism 114.

The communication interface 108 may take a variety of forms and may be configured to allow the server 102 to communicate with one or more devices according to any number of protocols. For instance, the communication interface 108 may be configured to allow the server 102 to communicate with the client 104 via the communication network 106. In one example, the communication interface 108 may take the form of a wired interface, such as an Ethernet interface. As another example, the communication interface 108 may take the form of a wireless interface, such as a cellular or WI-FI interface.

The processor 110 may include a general purpose processor (e.g., a microprocessor) and/or a special purpose processor (e.g., a digital signal processors (DSP)).

The data storage 112 may include one or more volatile, non-volatile, removable, and/or non-removable storage components, such as magnetic, optical, or flash storage, and may be integrated in whole or in part with the processor 110. Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions or acts, such as those described in this disclosure.

B. Client

Likewise, the client 104 may be configured for performing a variety of functions or acts such as those described in this disclosure. The client 104 may take a variety of forms, including for example, a mobile phone, tablet, laptop, media player, gaming device, wearable device, or vehicle. And the client 104 may include various components, including for example, a user interface 116, a communication interface 118, a processor 120, and a data storage 122, all of which may be communicatively linked with each other via a system bus, network, or other connection mechanism 124.

The user interface 116 may be configured for facilitating interaction between the client 104 and a user of the client 104, such as by receiving input from the user and providing output to the user. Thus, the user interface 116 may include input components such as a computer mouse, a keyboard, a touch-sensitive panel, or perhaps a microphone for receiving voice commands. In addition, the user interface 116 may include output components such as a display screen (which, for example, may be combined with a touch-sensitive panel) a sound speaker or other audio output mechanism, and a haptic feedback system. Furthermore, the user interface 116 may include a digital-analog conversion unit to facilitate playout of media content to a user. Moreover, the client 102 may provide output to the user via another user interface system (e.g., the client 102 may communicate with an audio output system via a short range wireless communication, such as a connection established in accordance with IEEE 802.15).

The communication interface 118 may take a variety of forms and may be configured to allow the client 104 to communicate with one or more devices according to any number of protocols. For instance, the communication interface 118 may be configured to allow the client 104 to communicate with the server 102 via the communication network 106. Further, the communication interface 118 may take the form of a wired or wireless interface.

The processor 120 may include a general purpose processor and/or a special purpose processor. The data storage 122 may include one or more volatile, non-volatile, removable, and/or non-removable storage components, and may be integrated in whole or in part with the processor 120. Further, the data storage 122 may take the form of a non-transitory computer-readable storage medium, having stored thereon program instructions that, when executed by the processor 120, cause the client 104 to perform one or more functions or acts, such as those described in this disclosure. Such program instructions may define or be part of a discrete software application, such a native app or web app, that can be executed upon user request for instance.

C. Communication Network

Generally, the communication network 106 may be configured to allow the server 102 and the client 104 to communicate with each other using any number of protocols. In addition, the communication network 106 may take a variety of forms, including for example a packet-switched network such as the Internet.

III. Example Operations

Methods of this disclosure will now be described principally in connection with providing a personalized news program to a user of the client 104. It will be understood, however, that this disclosure can extend to apply with respect to providing other types of media content as well, not necessarily limited to personalized news programs.

Figure 2:
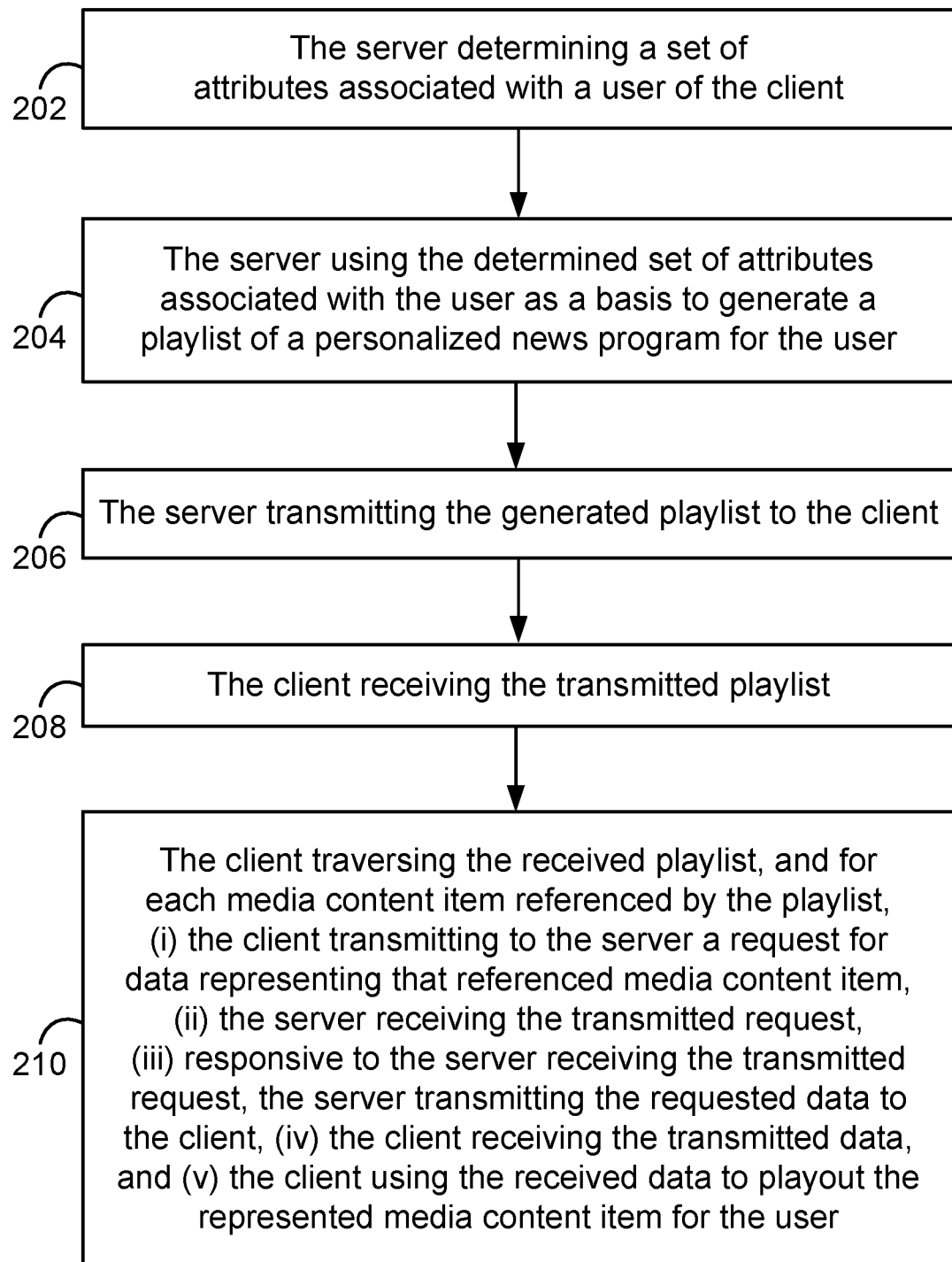
FIG. 2 is a flow chart depicting functions of an example method.

FIG. 2 is a flow chart depicting acts that can be carried out in an example method for providing a user of the client 104 with a personalized news program. At block 202, the method involves the server 102 determining a set of (i.e., one or more) attributes associated with a user of the client 104. At block 204, the method involves the server 102 using the determined set of attributes as a basis to generate a playlist of a personalized news program for the user. At block 206, the method involves the server 102 transmitting the generated playlist to the client 104, and at block 208, the method involves the client 104 receiving the transmitted playlist. At block 210, the method involves the client 104 traversing the received playlist, and for each media content item referenced by the playlist, (i) the client transmitting to the server a request for data representing that referenced media content item, (ii) the server receiving the transmitted request, (iii) responsive to the server receiving the transmitted request, the server transmitting the requested data to the client, (iv) the client receiving the transmitted data, and (v) the client using the received data to playout the represented media content item for the user.

In this process, each user-associated attribute that the server 102 determines may take various forms. By way of example, each attribute may relate to one or more of the following: the user's extent of interest in a particular type of news story, the user's interest in a particular type of audible news story, whether the user has a subscription to a news-related product or service (e.g., a newspaper subscription), the user's age, the user's gender, the user's current location, the user's destined location (e.g., a location to which the user is driving), the weather at the user's current location, the weather at the user's destined location, and the user's estimated travel time between the user's current location and the user's destined location.

Further, the act of the server 102 determining the set of attributes associated with the user may take various forms. In one example implementation, for instance, the server 102 may receive from the client 104 an identification of the user of the client 104, and the server 102 may then refer to one or more data sources that correlate or facilitate correlation of that identification with an attribute, so as to determine an attribute associated with the user.

In another example implementation, the client 104 may determine a user-associated attribute and may report the determined attribute to the server 102, in which case the server would determine the user-associated attribute by receiving the reported attribute from the client 104. To facilitate this, the client 104 may provide a configuration interface through which the user can manually enter or select a user-associated attribute, and the client 104 may thus determine the user-associated attribute by receiving user indications of the user-associated attribute through that interface. Alternatively or additionally, the client 104 may determine a user-associated attribute by evaluating information associated with the user, such as user profile records, browsing history, shopping history, location history, and the like. Other examples are possible as well.

For this purpose, the client 104 may determine the attribute associated with the user in a variety of ways. As one example, the client 104 may receive the attribute as input from the user. As another example, the client 104 may receive other input from the user, and the client 104 may use the input as a basis to determine the attribute. For instance, the client 104 may receive input from the user, such as the user's destined location, and the client 104 may use a positioning device and a navigation software application to determine the user's estimated travel time from the user's current location to the user's destined location. In some instances, the client may communicate with the server 102 or another server, such as a server affiliated with the mapping application, to determine such an attribute. Other example techniques for determining an attribute associated with a user are possible as well.

The server 102 may then use the determined set of attributes associated with the user in various ways to generate the playlist of the personalized news program for the user. For instance, based on the set of user-associated attributes, the server 102 may select particular audible news stories or types of audible news stories to specify as media content items in the playlist. As such, the server 102 may be configured with data that maps particular sets of user-associated attributes with particular types of audible news stories, possibly giving more weight to inclusion of certain types of audible news stories than to other types of audible news stories. For example, the data may indicate that a particular set of user-associated attributes suggests more likely user interest in entertainment news than in politics news, in which case the server 102 may structure the playlist to specify a greater extent of entertainment-related audible news stories than politics-related audible news stories. As another example, the data may indicate that a particular set of user-associated attributes suggests great user interest in sports, in which case the server 102 may structure the playlist to specify a relatively great extent of sports-related audible news stories.

In some examples, an audible news story's type may be defined by a set of attributes associated with the audible news story, examples of which may include or relate to one or more of the following: the audible news story's content category, the audible news story's target demographic (e.g., by age, gender, or location), the audible news story's creation date, the audible news story's author or other attribution information, the extent of popularity of the audible news story, the extent of popularity of a person or topic related to the audible news story, or the manner in which data representing the audible news story was generated.

These attributes may be stored in a variety of ways. For example, they may be stored as metadata along with the data representing the audible news story to which they correspond. These attributes may also be set in a variety of different ways, such as by a user via a user interface.

As indicated above, a media content item such as an audible news story may be represented by data. This data may be generated in a variety of ways. For example, the server 102 may generate data representing an audible news story by recording a narrator reading aloud a text-based version of the news story, or by using a well-known text-to-speech (TTS) software and/or hardware system to convert data representing a text-based version of a news story into data representing an audible version of the news story. Further, data representing a media content item may be stored in a variety of ways. For example, the data may be stored in the form of a digital audio file in a data storage, such as the data storage 112.

In one implementation, the act of the server 102 using the determined set of attributes associated with the user as a basis to generate a playlist of a personalized news program for the user may involve the server 102 (i) using the determined set of attributes associated with the user as a basis to select a playlist template from a group of templates (e.g., stored in the data storage 112), (ii) using the selected playlist template as a basis to select a set of audible news stories from a group of audible news stories (e.g., stored in the data storage 112), and (iii) generating a playlist that includes references to each audible news story from the selected set of audible news stories.

Generally, a playlist template serves as an outline for a playlist and may define a sequence of placeholders for media content attribute data. For each of these placeholders, the playlist template may further specify placeholder attribute data. Based on this placeholder attribute data, the server 102 may select a set of audible news stories, and replace that placeholder with media content attribute data for the selected set of audible news stories, thereby converting the playlist template into a playlist.

There may be a variety of different types of placeholder attribute data, examples of which may include a quantity tag and a type tag. A quantity tag specifies a quantity of audible news stories that the server 102 should select for the corresponding placeholder. And the type tag specifies the particular types of audible news stories that the server 102 should select for the corresponding placeholder.

In line with the discussion above, the playlist that the server 102 generates may define an ordered sequence of entries, each of which provides media content attribute data regarding a respective media content item, such as a particular audible news story. In practice, the playlist may provide this information in various ways, such as with use of extensible markup language (XML) for instance, in a manner that the client 104 would be configured to read.

For a given media content item, the media content attribute data may include a reference to the data representing the media content item, such as a network address or content identifier that the client 104 can read and use as a basis to request and receive the data representing the media content item for playout of the represented media content item. Thus, the client 104 may read the reference indicated for a given media content item to determine a network address or the like from which to obtain the data representing the media content item, and the client 104 may request and receive the data representing the media content item from that network address or by otherwise using the indicated reference.

Such a reference may have various levels of granularity. By way of example, the reference may be specific to data representing a particular audible news story, by specifying a particular story identifier or name of a news story media file for instance, in which case the client 104 could request the server 102 to transmit that data representing that particular audible news story and the server 102 could retrieve that data representing that particular audible news story from data storage and transmit it to the client 104. And as another example, the reference may be more general, specifying a class of news story, such as "sports" or "politics" for instance, in which case the client 104 could request the server 102 to transmit data representing an audible news story of that class generally, and the server 102 may then retrieve data representing a latest or most pertinent audible news story of that class and transmit it to the client 104. Further, any or all of these references may refer to locations other than server 102, such as to one or more other servers for instance.

Further, the server 102 may transmit the generated playlist to the client 104, and the client 104 may receive the generated playlist, in various ways. By way of example, the client 104 may transmit to the server 102 a hypertext transfer protocol (HTTP) request or the like seeking the playlist, and the server 102 may respond by generating the playlist and transmitting the playlist to the client 104 in an HTTP response or the like.

Continuing with reference to FIG. 2, as noted above, at block 210, the method involves the client 104 traversing the received playlist, and for each media content item of the sequence, (i) the client transmitting to the server, a request for data representing the media content item, (ii) the server receiving the transmitted request, (iii) responsive to the server receiving the transmitted request, the server transmitting to the client, the requested data, (iv) the client receiving the transmitted data, and (v) the client using the received data to playout the represented media content item for the user.

As further noted above, this process may involve streaming of the data representing the media content item from the server 102, or from one or more other servers, to the client 104. In practice, for instance, as the client 104 traverses the playlist, the client 104 may read each successive entry to determine the reference that the entry specifies for a media content item, and the client may transmit to the server 102 a request for the server 102 to stream the data representing that media content item to the client 104. To facilitate this, the client 104 may engage in signaling with the server 102 in accordance with the Real Time Streaming Protocol (RTSP), to establish a streaming media session and to specify the data representing the media content to be streamed, and the server 102 may stream the requested data to the client 104 in accordance with the Real-time Transport Protocol (RTP). As the client 104 receives this streamed data, the client 104 may then buffer and playout the content represented by the data in real time, providing the user with substantially continuous playout of the news program.

Figure 3:
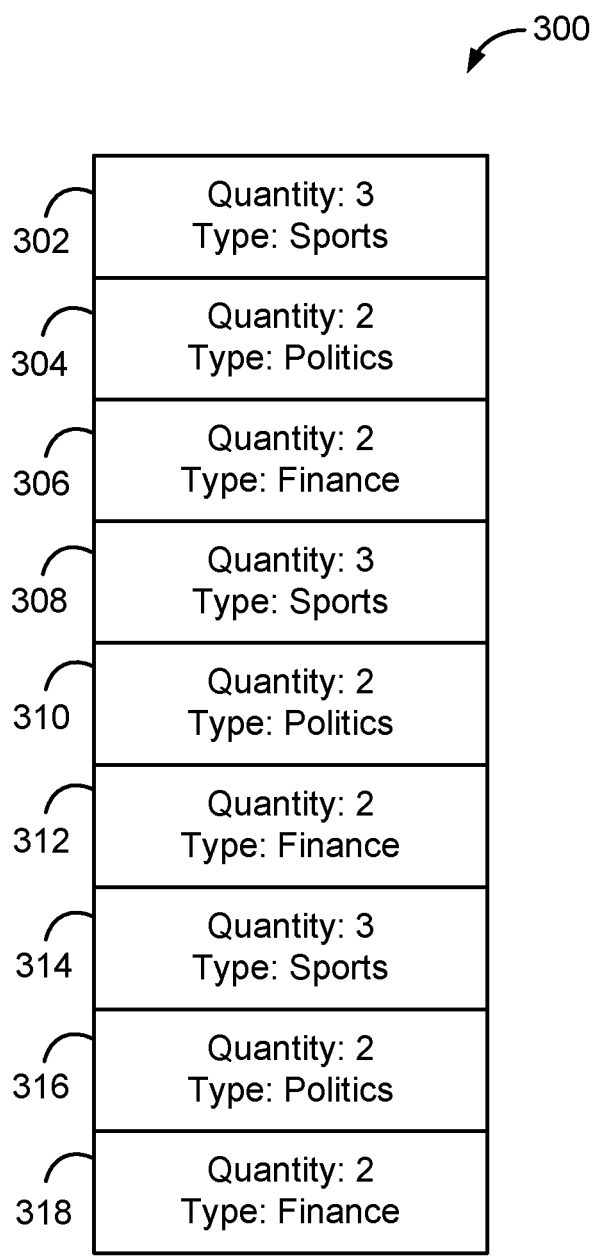
FIG. 3 is a diagram of an example playlist template.

To help appreciate operation of this process, FIG. 3 shows an example playlist template 300. The template 300 includes nine ordered entries 302, 304, 306, 308, 310, 312, 314, 316, and 318. Each of the entries serves as a placeholder for media content attribute data. And each of those entries includes placeholder attribute data, namely a quantity tag and a type tag. For example, the entry 302 includes a quantity tag that specifies "3" and a type tag that specifies a "Sports" content category type. As another example, the entry 304 includes a quantity tag that specifies "2" and a type tag that specifies a "Politics" content category type.

As indicated above in connection with block 204, the method may involve the server 102 using the selected playlist template as a basis to select a set of audible news stories from a group of audible news stories. This may involve, for each entry that serves as a placeholder of media content attribute data, the server 102 using the quantity and type tags of that entry as a basis to select a set of audible news stories. For example, for the entry 302, the server 102 may select a set of three audible news stories that are all associated with a "sports" content category attribute. As another example, for the entry 304, the server 102 may select a set of two audible news stories that are all associated with a "politics" content category attribute.

Additionally or alternatively, the server 102 may determine an attribute associated with an audible news story, and the server 102 may use the determined attribute as a basis to select the set of audible news stories from the group of audible news stories.

Also, as indicated above in connection with block 204, the method may involve generating a playlist that includes references to each audible news story from the selected set of audible news stories. This may involve the server 102 replacing placeholders of the playlist template with data representing the corresponding selected sets of audible news stories, and thereby generating a playlist by "converting" the playlist template into a playlist.

Figure 4:
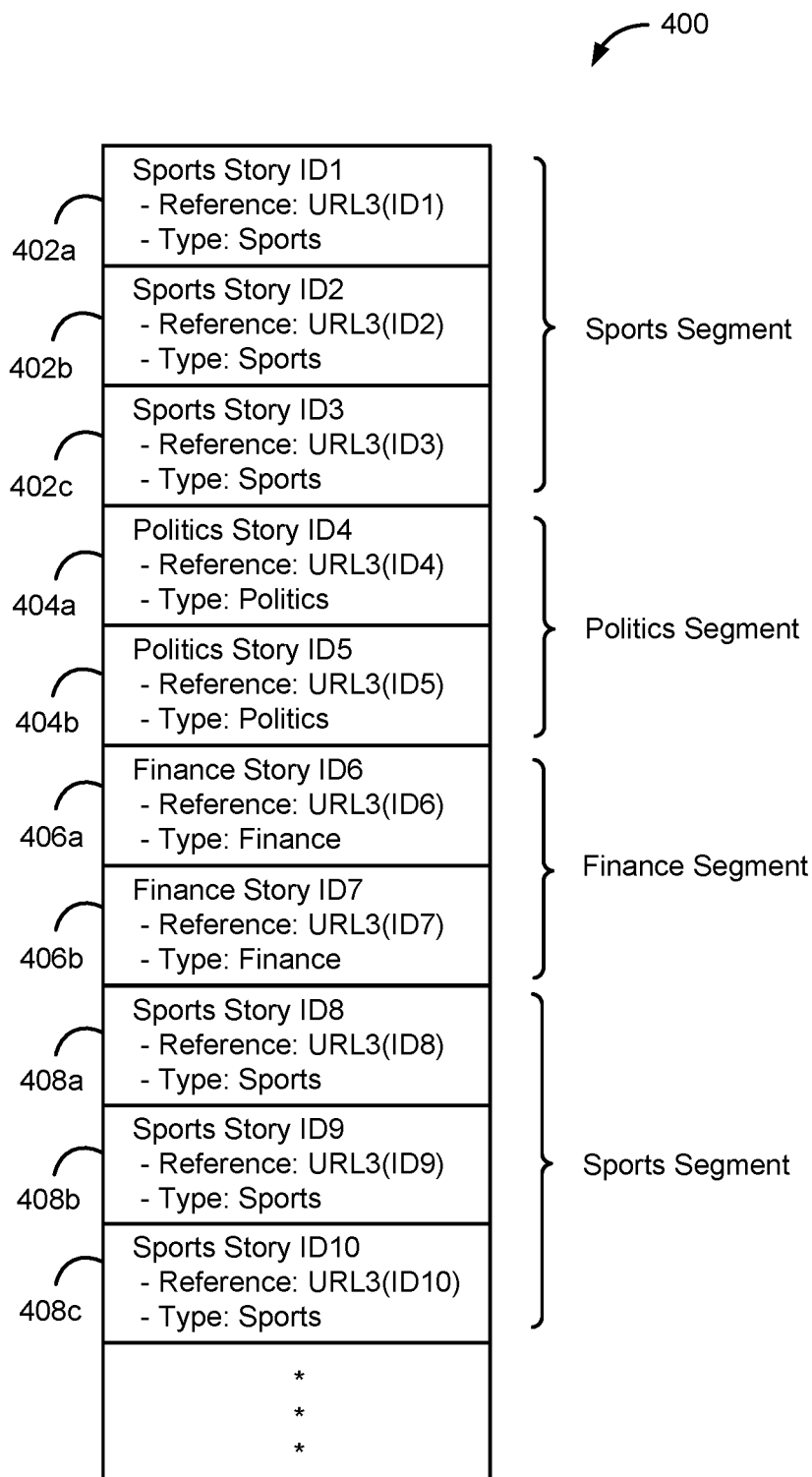
FIG. 4 is a diagram of an example playlist.

FIG. 4 shows a portion of an example playlist 400 that the server 102 may generate after the server 102 selects the playlist template 300. As shown, the generated playlist 400 include entries 402*a-c*, 404*a-b*, 406*a-b*, and 408*a-c*, each of which is for a respective audible news story and designates a respective reference and content category type. For example, entry 402*a* designates a "Sports Story ID1," with a reference in the form of "URL3" that may point to the server 102 and that designates "ID1" as a query parameter or the like, and with a content category type indication of "Sports." Entry 402*b* then designates a "Sports Story ID2," with a reference in the form of "URL3" that may point to the server 102 and that designates "ID2" as a query parameter, and with a content category type indication of "Sports." And entry 402c designates a "Sports Story ID3," with a reference in the form of "URL3" that may point to the server 102 and that designates "ID3" as a query parameter, and with a content category type indication of "Sports." As shown, this portion of the playlist 400 may be referred to as the "Sports Segment."

As another example, entry 404a designates a "Politics Story ID4," with a reference in the form of "URL3" that may point to the server 102 and that designates "ID4" as a query parameter, and with a content category type indication of "Politics." And entry 404b designates a "Politics Story ID5," with a reference in the form of "URL3" that may point to the server 102 and that designates "ID5" as a query parameter, and with a content category type indication of "Politics." As shown, this portion of the playlist 400 may be referred to as the "Politics Segment."

For brevity, FIG. 4 does not show additional entries after 408c, but it should be apparent that the server 102 may generate the remainder of the playlist 400 using the techniques described above.

Upon receipt of the playlist 400 from the server 102, the client 104 may traverse the entries and, one by one, request streaming of the referenced media content items from the server 102, or one or more other servers, and may receive and playout the requested media content items in the specified sequence, thereby playing out the news program.

Figure 5:
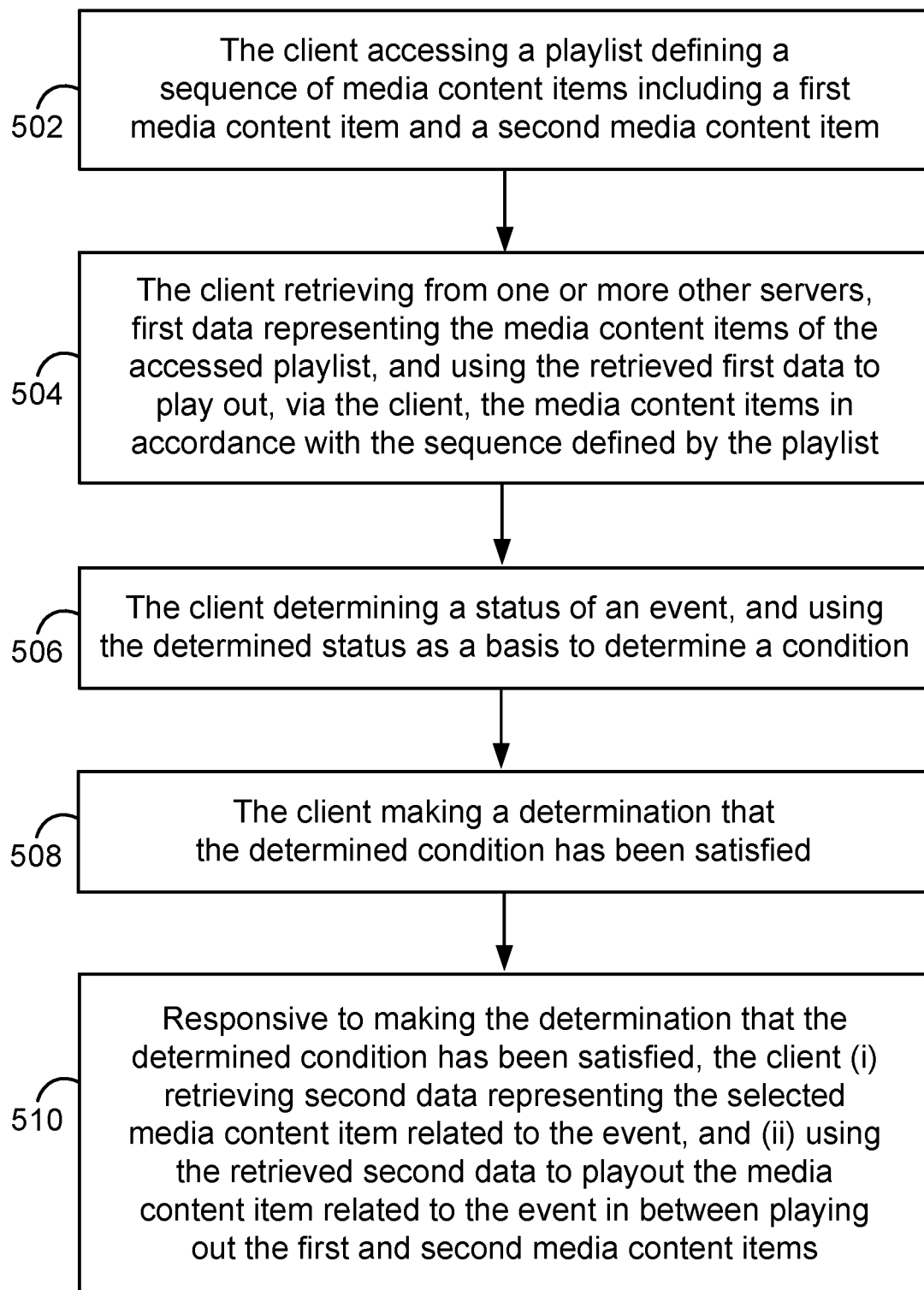
FIG. 5 is a flow chart depicting functions of another example method.

As noted above, in some examples, the client 104 may retrieve data representing a particular media content item that is not referenced in the playlist, and may use the retrieved data to playout the particular media content item by inserting it into the news program at a particular position in the news program. FIG. 5 is a flow chart depicting acts that can be carried out in an example method related to this feature.

At block 502, the method involves the client 104 accessing a playlist defining a sequence of media content items including a first media content item and a second media content item. In one example, the server 102 may transmit the playlist to the client 104. In such a case, the client 104 accessing the playlist may involve the client 104 receiving the playlist from the server 102. Also, in one example, the first and second media content items may be sequentially adjacent as defined by the playlist.

At block 504, the method involves the client 104 retrieving from one or more servers (e.g., the server 102), first data representing the media content items of the accessed playlist, and using the retrieved first data to playout the media content items in accordance with the sequence defined by the playlist.

At block 506, the method involves the client 104 determining a status of an event, and using the determined status of the event as a basis to determine a condition. In one particular example, the event may be a sporting event such as a baseball game. The event may also have a status. For example, a sporting event may have a status of being in progress or not being in progress. As such, in one example the act of determining the status of the event may involve determining whether or not a sporting event is in progress. Other types of events and statuses are also possible.

In some instances, the client 104 may determine the status of an event by communicating with one or more devices that provide information about the event. For example, the client 104 may determine the status of a sporting event by retrieving from a server data representing a current status of the sporting event.

As indicated above, the client 104 may use a determined status of an event as a basis to determine a condition. In one example, this may involve the client 104 using mapping data (e.g., stored in the data storage 122) to map the event to the condition. The condition may take a variety of forms and may be a complex condition that includes multiple sub-conditions. For example, a condition A may be that both condition B and condition C are satisfied. As another example, a condition D may be that either condition E or condition F is satisfied. Other examples are possible as well.

In one example, a condition (or sub-condition) may be that a separation between the first and second media content items is in a particular position with respect to the sequence defined by the playlist. As another example, a condition may be that the client 104 has played out media content items of the playlist for a threshold duration (e.g., for at least ten minutes). As another example, a condition may be that a threshold duration (e.g., at least five minutes, or at least thirty minutes) has passed since another media content item of the content category type has been played out in connection with a separation in between the first and second media content items. As yet another example, a condition may be that a threshold number of media content items related to the event have been played out in connection with a separation in between media content items of the playlist. As yet another example, a condition may be that a particular time is within a particular time period range. As yet another example, a condition may be that data representing a media content item related to the event is available for retrieval.

At block 508, the method involves the client 104 making a determination that the determined condition has been satisfied. And at block 510, the method involves responsive to the determination being that the determined condition has been satisfied, the client 104 (i) retrieving second data representing a media content item related to the event, and (ii) using the retrieved second data to playout the media content item related to the event in between playing out the first and second media content items.

In some instances, at least one of (i) the client 104 determining the status of the event, (ii) the client 104 making the determination that the determined condition has been satisfied, and (iii) the client 104 retrieving second data representing the media content item related to the event, occurs while at least one of the media content items represented by the retrieved first data (e.g., the first media content item) is being played out. This may allow the client 104 to retrieve and playout time-sensitive media while it still has a desired level of "freshness." Also, it should be noted that the example method described above may be repeated multiple times such that multiple media content items are retrieved and played out in the manner described, but with each of those media content items being played out at a different time.

To illustrate the method of FIG. 3, consider the following two examples that relate to a particular type of event, namely a baseball game. For these examples, it is assumed that at a first time, the game is in progress, and at a second time, the game is concluded (i.e., the game is not in progress).

In a first example, the client 104 may access a first playlist defining a sequence of media content items including a first media content item and a second media content item. At the first time, the client 104 may determine that the game is in progress. The client 104 may the use this determined status of the game as basis to determine a first condition, which may be a condition that at least five minutes have passed since another media content item related to the game has been played out in connection with a separation between media content items of the playlist. The client 104 may then (assuming that the condition has actually been satisfied) determine that the condition has been satisfied, and in response, the client 104 may (i) retrieve data representing a particular media content item providing a score of the game, and (ii) use the retrieved data to playout the particular media content item in between playing out the first and second media content items.

For comparison, in a second example, the client 104 may access a second playlist defining a sequence of media content items including a third media content item and a fourth media content item. At the second time, the client 104 may determine that the game is not in progress. The client 104 may the use this determined status of the game as basis to determine a second condition, which may be a condition that at least thirty minutes have passed since another media content item related to the game has been played out in connection with a separation between media content items of the playlist. The client 104 may then (assuming that the condition has actually been satisfied) determine that the condition has been satisfied, and in response, the client may (i) retrieve data representing a particular media content item providing a score of the game, and (ii) use the retrieved data to playout the particular media content item in between playing out the third and fourth media content items.

As illustrated by the two examples above, the client 104 may use the status of the baseball game as a basis to determine when it will insert into a sequence of media content items, a media content item providing a score of the game. Indeed, according to these examples, if the game is in progress, the client 104 may insert the media content item providing the score more frequently than if the game is not in progress. This may be appealing to a user who may prefer to receive score information more frequently while the game is in progress.

Figure 6:
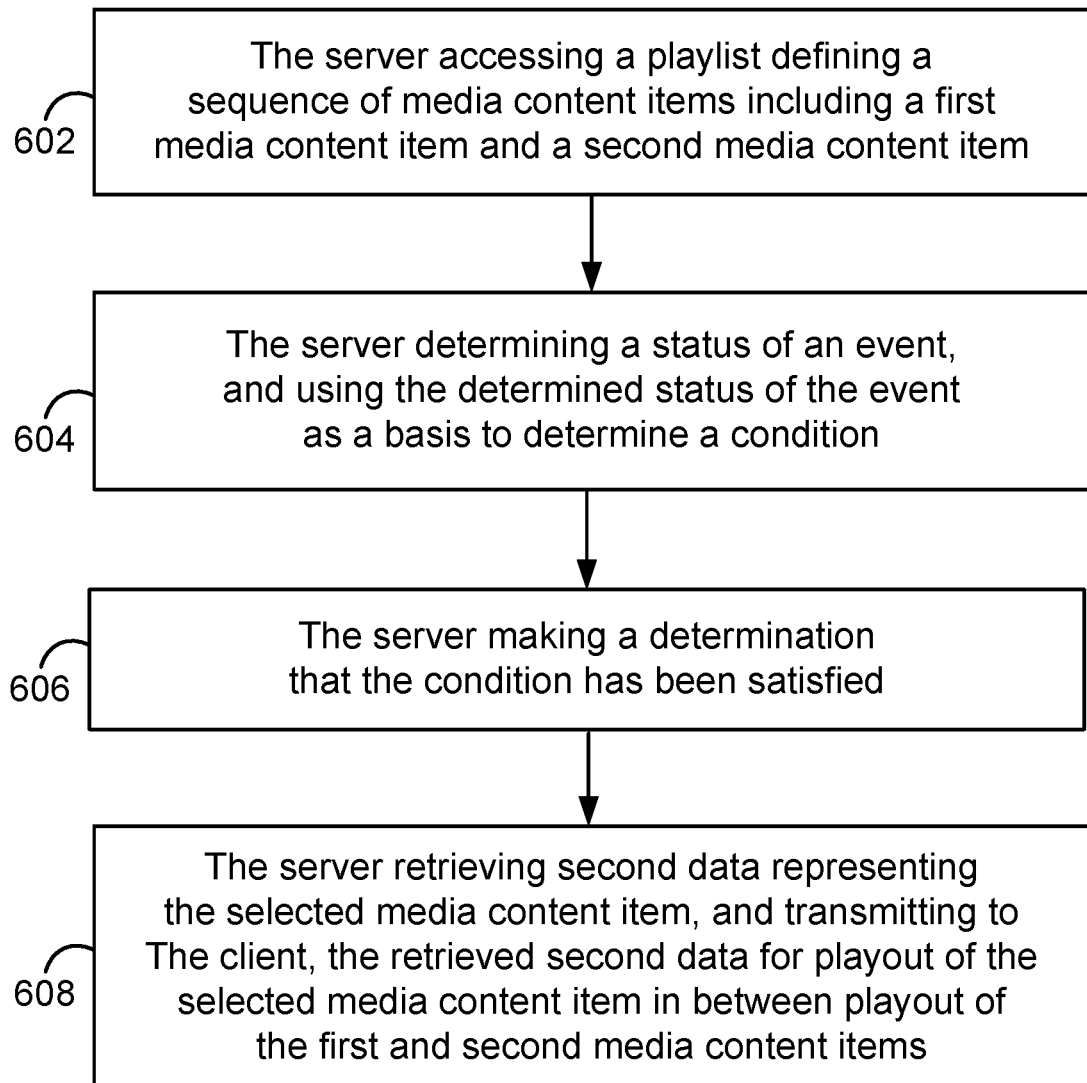
FIG. 6 is a flow chart depicting functions of another example method.

FIG. 6 is a flow chart depicting functions that can be carried out in another example method. At block 602, the method involves the server 102 accessing a playlist defining a sequence of media content items including a first media content item and a second media content item. The server 102 may access the playlist from the data storage 112, for example.

At block 604, the method involves the server 104 determining a status of an event, and using the determined status of the event as a basis to determine a condition. And at block 606, the method involves the server 102 making a determination that the condition has been satisfied. And at block 608, the method involves responsive to the determination being that each condition in the condition set has been satisfied, the server 102 (i) retrieving second data representing a media content item related to the event, and (ii) transmitting to the client 102, the retrieved second data for playout of the media content item related to the event in between playing out the first and second media content items.

IV. Example Variations

The variations described in connection with select examples of the disclosed system and method may be applied to all other examples of the disclosed system and method.

Further, while one or more acts have been described as being performed by or otherwise related to certain devices or entities (e.g., the server 102 or the client 104), the acts may be performed by or otherwise related to any device or entity. As such, any function that has been described as being performed by the server 102 could alternatively be performed by a different server or by the client 104.

Further, the acts need not be performed in the disclosed order, although in some examples, an order may be preferred. Also, not all acts need to be performed to achieve the desired advantages of the disclosed system and method, and therefore not all acts are required.

Also, while the disclosed methods have been described principally in connection with providing a personalized news program, the methods may be applied in connection with other applications or environments.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A client computing device comprising:
   a processor; and
   a non-transitory computer-readable medium having stored thereon program instructions that, when executed by the processor, cause the client computing device to perform a set of acts comprising:
   accessing a playlist defining a sequence of media content items including a first media content item and a second media content item;
   using the accessed playlist, requesting and receiving, from one or more server computing devices, first data representing the media content items of the accessed playlist, and using the received first data to playout the media content items; and
   while playing out at least one of the media content items represented by the received first data:
   (a) determining a status of an event, and using the determined status of the event as a basis to determine a condition;
   (b) making a determination that the determined condition has been satisfied; and
   (c) responsive to making the determination that the determined condition has been satisfied, (i) requesting and receiving, from the one or more server computing devices, second data representing a media content item that is related to the event and that is not specified in the accessed playlist, and (ii) using the retrieved second data to playout the media content item related to the event in between playing out the first and second media content items.

2. The client computing device of claim 1, wherein the event comprises a sporting event, and wherein determining the status of the event comprises determining whether or not the sporting event is in progress.

3. The client computing device of claim 1, wherein the first and second media content items are immediately adjacent to each other in the defined sequence.

4. The client computing device of claim 1, wherein the condition corresponds to a relationship between a content category type and respective content category types of at least one of the media content items that has been played out.

5. The client computing device of claim 1, wherein the determined condition comprises a condition that a threshold duration has passed since another media content item related to the event has been played out in connection with a separation between media content items of the playlist.

6. The client computing device of claim 1, wherein the determined condition comprises a condition that a threshold number of media content items related to the event have been played out in connection with a separation in between media content items of the playlist.

7. The client computing device of claim 1, wherein using the accessed playlist, requesting and receiving, from one or more server computing devices, first data representing the media content items of the accessed playlist, and using the received first data to playout the media content items comprises:
   traversing the accessed playlist; and
   for each media content item of the media content items, requesting and receiving, from the one or more server computing devices, data representing the media content item, and using the received data to playout the media content item.

8. A server computing device comprising:
   a processor; and
   a non-transitory computer-readable medium having stored thereon program instructions that, when executed by the processor, cause the server computing device to perform a set of acts comprising:
      accessing a playlist defining a sequence of media content items including a first media content item and a second media content item, wherein a client computing device is configured to use the accessed playlist to request, from the server computing device, first data representing the media content items of the accessed playlist, wherein the server computing device is configured to transmit the first data to the client computing device in response to the request, and wherein the client computing device is further configured to use the first data received from the server computing device to playout the media content items; and
      while the client computing device is playing out at least one of the media content items:
         (a) determining a status of an event, and using the determined status of the event as a basis to determine a condition;
         (b) making a determination that the determined condition has been satisfied; and
         (c) responsive to making the determination that the determined condition has been satisfied, (i) retrieving second data representing a media content item that is related to the event and that is not specified in the accessed playlist, and (ii) transmitting, to the client computing device, the retrieved second data for playout of the media content item related to the event in between playing out the first and second media content items.

9. The server computing device of claim 8, wherein the event comprises a sporting event, and wherein determining the status of the event comprises determining whether or not the sporting event is in progress.

10. The server computing device of claim 8, wherein the first and second media content items are immediately adjacent to each other in the defined sequence.

11. The server computing device of claim 8, wherein the condition corresponds to a relationship between a content category type and respective content category types of at least one of the media content items that has been played out.

12. The server computing device of claim 8, wherein the determined condition comprises a condition that a threshold duration has passed since another media content item related to the event has been played out in connection with a separation between media content items of the playlist.

13. The server computing device of claim 8, wherein the determined condition comprises a condition that a threshold number of media content items related to the event have been played out in connection with a separation in between media content items of the playlist.

14. The server computing device of claim 8, wherein the client computing device is further configured to traverse the accessed playlist and, for each media content item of the media content items, request, from the server computing device, data representing the media content item, and use the received data to playout the media content item.

15. A non-transitory computer-readable medium having stored thereon program instructions that when executed by a processor cause performance of a set of acts comprising:
   accessing, by a server computing device, a playlist defining a sequence of media content items including a first media content item and a second media content item, wherein a client computing device is configured to use the accessed playlist to request, from the server computing device, first data representing the media content items of the accessed playlist, wherein the server computing device is configured to transmit the first data to the client computing device in response to the request, and wherein the client computing device is further configured to use the first data received from the server computing device to playout the media content items; and
   while the client computing device is playing out at least one of the media content items:
      (a) determining, by the server computing device, a status of an event, and using, by the server computing device, the determined status of the event as a basis to determine a condition;
      (b) making, by the server computing device, a determination that the determined condition has been satisfied; and
      (c) responsive to making the determination that the determined condition has been satisfied, (i) retrieving, by the server computing device, second data representing a media content item that is related to the event and that is not specified in the accessed playlist, and (ii) transmitting, by the server computing device, to the client computing device, the retrieved second data for playout of the media content item related to the event in between playing out the first and second media content items.

16. The non-transitory computer-readable medium of claim 15, wherein the event comprises a sporting event, and wherein determining the status of the event comprises determining whether or not the sporting event is in progress.

17. The non-transitory computer-readable medium of claim 15, wherein the first and second media content items are immediately adjacent to each other in the defined sequence.

18. The non-transitory computer-readable medium of claim 15, wherein the condition corresponds to a relationship between a content category type and respective content category types of at least one of the media content items that has been played out.

19. The non-transitory computer-readable medium of claim 15, wherein the determined condition comprises a condition that a threshold duration has passed since another media content item related to the event has been played out in connection with a separation between media content items of the playlist.

20. The non-transitory computer-readable medium of claim 15, wherein the determined condition comprises a condition that a threshold number of media content items related to the event have been played out in connection with a separation in between media content items of the playlist.

* * * * *